United States Patent Office 3,191,029
Patented June 22, 1965

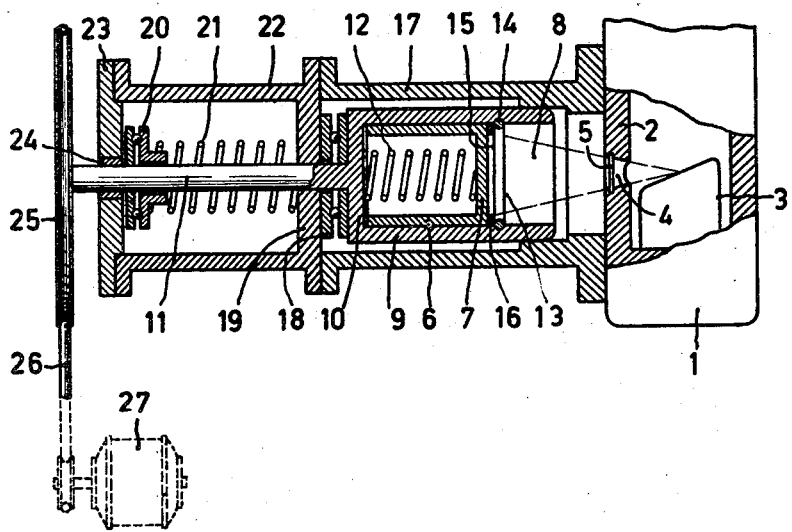

3,191,029
MICRORADIOGRAPHIC DEVICE WITH MEANS TO CONTINUOUSLY ROTATE A PHOTOGRAPHIC FILM AND SPECIMEN IN AN X-RAY BEAM
Gerhard Heinrich Friedrich de Vries, Eindhoven, Netherlands, assignor to North American Philips Company, Inc., New York, N.Y., a corporation of Delaware
Filed June 6, 1962, Ser. No. 200,387
Claims priority, application Netherlands, June 29, 1961, 266,528
2 Claims. (Cl. 250—52)

It is possible to take X-ray photographs of biological textures showing the micro-structure of the texture. For this technique, referred to as microradiography, use is made of devices comprising an X-ray tube for soft rays and a camera. The specimen, a thin texture layer from 10 to 100 microns thick, is positioned in the X-ray beam in the camera either at a short distance in front of a film sensitive to the rays, or provided on the surface of the film.

The specimen and the film were initially arranged within the exhausted space of the X-ray tube and the X-rays could reach the preparation unhindered. Such an arrangement is serviceable only for experimental purposes since changing the specimen is complicated and the X-ray tube has to be exhausted again for each change. In this case, use is made of a closed X-ray tube in which the aperture in the wall for passage of the X-rays is covered by a thin beryllium window, the preparation being arranged outside the vacuous space. A beryllium window from 50 to 100 microns thick is sufficiently transparent for X-rays which are absorbed in the extremely thin texture layer to an extent such that contrasts between zones of slightly differing densities occur. The wave-length of these rays must lie between 1 A. and 10 A.

Photographs thus obtained often show irregularly formed stains in addition to the contrasts to be examined. The image of the structure becomes less observable with such a stained background. The interfering contrasts are evidently due to differences in intensity across the section of the beam and are likely to be due to the absorption of rays in the tube window. Irregular absorption of rays occurs if the window is not of uniform thickness throughout its surface, or due to inhomogeneity in the structure of the window material, or if the density of the window material is not uniform due to the presence of small amounts of impurities.

An object of the invention is to obviate the above-mention disadvantage. According to the invention, to this end the film and the specimen are arranged to be movable with respect to the X-ray beam.

A small displacement of the film and the specimen usually suffices to prevent staining from interfering with the desired sharp contours. The remaining vague transitions between zones of different staining distinctly differ from the contrasts resulting from the structure of the specimen and thus do not cause confusion in judging the photograph. A result found satisfactory in practice is obtained in a simple manner if the film and the preparation are jointly rotated during photographing about an axis at right angles to the film surface and coinciding with the central ray of the X-ray beam.

In order that the invention may be readily carried into effect, a device of this kind will now be described in detail, by way of example, with reference to the accompanying diagrammatic drawing.

The X-rays necessary for taking a photograph are provided by an X-ray tube the anode end 1 of which is shown, comprising a cylindrical metallic envelope 2 containing the anode 3. The wall has an aperture 4 closed by a window 5 which is very thin and made of a material satisfactorily permeable to X-rays, such as beryllium. Beryllium is regarded to be the metal which is most serviceable for the required soft X-rays and the invention is therefore expecially intended for use of the device in combination with an X-ray tube having a window made of said material. The thickness of the window may not be arbitrarily small the material in certain cases being porous if it has a very small thickness. It has been found possible with fairly good result to manufacture windows of 100 microns thick and sometimes a usable window is obtained having a thickness of 50 microns. Nevertheless, the soft radiation is noticeably absorbed in the window, which gives rise to shadow formation (staining) if irregularities in the thickness and in the structure of the material of the window occur. The photographic film in the camera is then not irradiated uniformly throughout its surface. The resulting influence upon the specimen caused by staining may be reduced by rotation of the film carrier. This carrier indicated by 6, comprises a sleeve having a base 7 on the outer side of which the film is glued. The carrier 6 is housed in a holder 8 comprising a cylinder 9 having a base 10 to which a spindle 11 is secured. The holder 8 is open at the end adjacent the X-ray tube. From this side, the carrier 6 may be introduced after a spring 12 previously having been provided, the spring 12 being compressed when the carrier 6 is placed in position. The inner wall of the holder 8 has a recess 13, for example circular, which accommodates a rubber ring 14 for holding the carrier 6. Before providing the ring 14, a specimen table 15 is first arranged, comprising a ring 16 the aperture of which is covered by film carrying the specimen. The ring 16 is clamped in position between the carrier 6 and the rubber ring 14 by the pressure of spring 12. The specimen table 15 and the film carrier 6 thus form a unit and can rotate, together with the spindle 11, in the housing 17, which is joined to the wall 2 of the X-ray tube in any conventional manner.

Several bearings, two of which are thrust bearings, serve to support the spindle 11 and the holder 8. One bearing 18 lies between the base 10 of the holder 8 and a cover 19 closing the camera housing 17, the other bearing 20 being seated on the spindle 11. A spring 21 provided between the bearing 20 and the cover 19 puts the two bearings 18 and 20 under pressure, thus preventing any play in the longitudinal direction of the holder.

The cover 19 of the camera housing 17 has connected to it a sleeve 22 having a cover 23 and a sliding bearing 24 through which the spindle 11 extends.

The outer extremity of spindle 11 carries a pulley 25 which may be driven through a rope 26 by means of an electric motor 27.

By removing the cover 19 from the housing 17 of the camera the rotary holder is also taken out and the aperture in the holder for removing the film carrier is accessible. To this end, the rubber ring 14 is removed, whereupon the carrier 6 and the preparation table 15 are pushed out by the spring 12. Changing the film and the preparation is thus very simple.

What is claimed is:

1. Apparatus for making X-ray photographs comprising an X-ray tube having a window of a material permeable to X-rays, means for holding a specimen on an associated film in the beam of X-rays passing through said window, and means for rotating said specimen and film holding means about an axis coincident with the central ray within the said beam and normal to the image surface of the film for continuously exposing the same area of said specimen and film to said beam while being rotated.

2. Apparatus for making X-ray photographs comprising the combination of an X-ray tube having a window permeable to X-rays, and means for rotatably holding a specimen and film within the beam of X-rays passing through said window; said means comprising a hollow housing member open at one end, a first sleeve rotatably supported within said housing member, means driving said first sleeve, a second sleeve concentric within said first sleeve having a base exposed to the beam of X-rays and carrying said specimen and film, means connected with said first sleeve for defining a removable shoulder within said first sleeve, and a resilient member urging said second sleeve against said shoulder and removably securing said sleeves together for unitary rotation.

References Cited by the Examiner

UNITED STATES PATENTS

| | | | |
|---|---|---|---|
| 2,417,110 | 3/47 | Hillier | 250—49.5 |
| 2,437,688 | 3/48 | Forssell | 250—53 |
| 2,500,948 | 3/50 | Kaiser et al. | 250—53 |

FOREIGN PATENTS 723,656   8/42   Germany.

RALPH G. NILSON, *Primary Examiner.*